US009168759B2

(12) United States Patent
Hegarty et al.

(10) Patent No.: US 9,168,759 B2
(45) Date of Patent: Oct. 27, 2015

(54) METHOD AND APPARATUS FOR PRINTHEAD CONTROL

(71) Applicant: ZIH Corp., Lincolnshire, IL (US)

(72) Inventors: Patrick J. Hegarty, Dedham, MA (US); Michael L. Lamontagne, Johnston, RI (US)

(73) Assignee: ZIH Corp., Lincolnshire, IL (US)

( * ) Notice: Subject to any disclaimer, the term of this patent is extended or adjusted under 35 U.S.C. 154(b) by 184 days.

(21) Appl. No.: 13/729,857

(22) Filed: Dec. 28, 2012

(65) Prior Publication Data

US 2014/0009768 A1 Jan. 9, 2014

Related U.S. Application Data

(60) Provisional application No. 61/583,428, filed on Jan. 5, 2012.

(51) Int. Cl.
*B41J 2/355* (2006.01)
*B41J 2/32* (2006.01)
*G06K 15/02* (2006.01)
*G06K 15/10* (2006.01)

(52) U.S. Cl.
CPC *B41J 2/32* (2013.01); *B41J 2/3555* (2013.01); *G06K 15/028* (2013.01); *G06K 15/10* (2013.01); *G06K 15/1827* (2013.01)

(58) Field of Classification Search
USPC ......... 347/171, 211, 215, 217, 218, 188, 115, 347/180–182
See application file for complete search history.

(56) References Cited

U.S. PATENT DOCUMENTS

| | | | |
|---|---|---|---|
| 4,389,935 A | 6/1983 | Arai | |
| 4,574,293 A | 3/1986 | Inui et al. | |
| 5,806,993 A | 9/1998 | Petterutti et al. | |
| 5,815,191 A * | 9/1998 | Michielsen et al. | 347/188 |
| 6,014,499 A | 1/2000 | Sasaki | |
| 6,108,017 A * | 8/2000 | Katakura et al. | 347/115 |
| 8,179,409 B2 * | 5/2012 | Saga | 347/211 |
| 2002/0021349 A1 | 2/2002 | Lee | |
| 2002/0060707 A1 | 5/2002 | Yu et al. | |
| 2004/0012829 A1 | 1/2004 | Takahashi | |
| 2004/0196320 A1 | 10/2004 | Walmsley et al. | |
| 2006/0164447 A1 | 7/2006 | Poole et al. | |
| 2008/0137115 A1 | 6/2008 | Kim | |
| 2012/0224196 A1 | 9/2012 | Baumgartner et al. | |

FOREIGN PATENT DOCUMENTS

EP 0552719 A2 7/1993

OTHER PUBLICATIONS

International Search Report and Written Opinion from International Application No. PCT/US2012/072018 dated Oct. 22, 2013.
(Continued)

*Primary Examiner* — Kristal Feggins
(74) *Attorney, Agent, or Firm* — Alston & Bird LLP

(57) ABSTRACT

A method, apparatus, and computer program product are described herein for controlling a printing device. In an example embodiment, a print line is divided into frames and frame dot states are determined based on neighboring frame dot states. Maximum motor speeds of the printing device may be adjusted so that actual motor speeds change gradually during printing. The print engine may detect a printhead type by sending a signal to the printhead and receiving a response.

12 Claims, 12 Drawing Sheets

(56) References Cited

OTHER PUBLICATIONS

Office Action for U.S. Appl. No. 14/296,798 dated Oct. 2, 2014.
Office Action for U.S. Appl. No. 14/296,798 dated Jan. 29, 2015.
Notice of Allowance for U.S. Appl. No. 14/296,798 dated Mar. 18, 2015.
U.S. Appl. No. 14/623,066, filed Feb. 16, 2015 entitled *Method, Apparatus, and Computer Product for Programmatically Performing Media Detection Utilizing a Dual Sensor Media Detection System*.
International Search Report for Application No. PCT/US2012/072018, dated Mar. 20, 2013.

* cited by examiner

Media movement direction

|  | Dot 1 | Dot 2 | Dot 3 | Dot 4 | Dot 5 |
|---|---|---|---|---|---|
| Line 16 | 0 | 0 | 0 | 0 | 0 |
| Line 15 | 0 | 1 | 0 | 1 | 0 |
| Line 14 | 0 | 0 | 0 | 0 | 0 |
| Line 13 | 0 | 0 | 0 | 0 | 0 |
| Line 12 | 0 | 0 | 0 | 0 | 0 |
| Line 11 | 0 | 0 | 0 | 0 | 0 |
| Line 10 | 1 | 0 | 0 | 1 | 1 |
| Line 9 | 1 | 0 | 0 | 1 | 1 |
| Line 8 | 1 | 0 | 0 | 1 | 1 |
| Line 7 | 1 | 0 | 0 | 0 | 1 |
| Line 6 | 1 | 0 | 0 | 0 | 1 |
| Line 5 | 1 | 1 | 1 | 1 | 1 |
| Line 4 | 1 | 1 | 0 | 0 | 1 |
| Line 3 | 1 | 1 | 1 | 0 | 1 |
| Line 2 | 1 | 0 | 0 | 0 | 1 |
| Line 1 | 1 | 1 | 0 | 1 | 1 |
Figure 2A
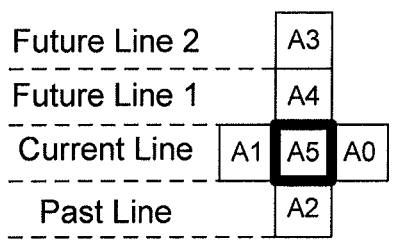
Figure 2B
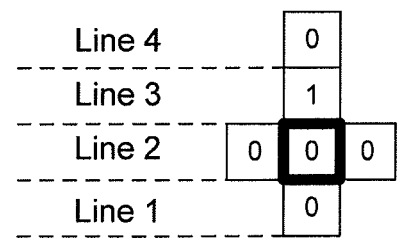
Figure 2C
| A5 | A4 | A3 | A2 | A1 | A0 |
|---|---|---|---|---|---|
| 0 | 1 | 0 | 0 | 0 | 0 |
Figure 2D

|  | Dot 1 | Dot 2 | Dot 3 | Dot 4 | Dot 5 |
|---|---|---|---|---|---|
| Frame 8 | 1 | 1 | 1 | 0 | 1 |
| Frame 7 | 1 | 1 | 0 | 0 | 1 |
| Frame 6 | 1 | 0 | 0 | 0 | 1 |
| Frame 5 | 1 | 0 | 0 | 0 | 1 |
| Frame 4 | 1 | 0 | 0 | 0 | 1 |
| Frame 3 | 1 | 0 | 0 | 0 | 1 |
| Frame 2 | 1 | 0 | 0 | 0 | 1 |
| Frame 1 | 1 | 0 | 0 | 0 | 1 |

| line | dot 0 | dot 1 | dot 2 | dot 3 | dot 4 | Max speed | Strb Time | Actual speed |
|------|-------|-------|-------|-------|-------|-----------|-----------|--------------|
| 32 | 1 | 1 | 1 | 1 | 1 | 0.5 | 0.003 | 0.5 |
| 31 | 1 | 1 | 1 | 1 | 1 | 1.0 | 0.003 | 0.5 |
| 30 | 1 | 1 | 0 | 1 | 1 | 1.0 | 0.0025 | 0.5 |
| 29 | 1 | 1 | 0 | 1 | 1 | 1.0 | 0.0025 | 0.5 |
| 28 | 1 | 0 | 0 | 1 | 1 | 2.0 | 0.002 | 0.5 |
| 27 | 1 | 0 | 0 | 1 | 1 | 2.0 | 0.002 | 0.5 |
| 26 | 0 | 1 | 0 | 1 | 0 | 2.0 | 0.0015 | 0.5 |
| 25 | 1 | 1 | 1 | 1 | 1 | 2.0 | 0.003 | 0.5 |
| 24 | 1 | 1 | 1 | 1 | 1 | 2.0 | 0.003 | 0.5 |
| 23 | 1 | 1 | 0 | 1 | 1 | 2.0 | 0.0025 | 0.5 |
| 22 | 1 | 0 | 0 | 1 | 1 | 2.0 | 0.002 | 0.5 |
| 21 | 1 | 0 | 0 | 1 | 1 | 2.0 | 0.002 | 0.5 |
| 20 | 1 | 0 | 0 | 1 | 1 | 2.0 | 0.002 | 0.5 |
| 19 | 0 | 1 | 0 | 1 | 0 | 2.0 | 0.0015 | 0.5 |
| 18 | 0 | 1 | 0 | 1 | 0 | 2.0 | 0.0015 | 0.5 |
| 17 | 0 | 1 | 0 | 1 | 0 | 2.0 | 0.0015 | 0.6 |
| 16 | 0 | 0 | 0 | 0 | 0 | 3.0 | 0.001 | 0.7 |
| 15 | 0 | 1 | 0 | 1 | 0 | 2.0 | 0.0015 | 0.9 |
| 14 | 0 | 0 | 0 | 0 | 0 | 3.0 | 0.001 | 1.3 |
| 13 | 0 | 0 | 0 | 0 | 0 | 3.0 | 0.001 | 2.0 |
| 12 | 0 | 0 | 0 | 0 | 0 | 3.0 | 0.001 | 2.0 |
| 11 | 0 | 0 | 0 | 0 | 0 | 3.0 | 0.001 | 2.0 |
| 10 | 1 | 0 | 0 | 1 | 1 | 2.0 | 0.002 | 2.0 |
| 9 | 1 | 0 | 0 | 1 | 1 | 2.0 | 0.002 | 2.0 |
| 8 | 1 | 0 | 0 | 1 | 1 | 2.0 | 0.002 | 1.9 |
| 7 | 1 | 0 | 0 | 0 | 1 | 2.0 | 0.0015 | 1.9 |
| 6 | 1 | 0 | 0 | 0 | 1 | 2.0 | 0.0015 | 1.8 |
| 5 | 1 | 1 | 1 | 1 | 1 | 1.5 | 0.003 | 1.5 |
| 4 | 1 | 1 | 0 | 0 | 1 | 1.0 | 0.002 | 1.0 |
| 3 | 1 | 1 | 1 | 0 | 1 | 1.0 | 0.0025 | 0.5 |
| 2 | 1 | 0 | 0 | 0 | 1 | 2.0 | 0.0015 | 0.5 |
| 1 | 1 | 1 | 0 | 1 | 1 | 1.0 | 0.0025 | 0.5 |

| PIN No. | SIGNAL |
|---|---|
| 1 | $V_H$ |
| 2 | $V_H$ |
| 3 | $V_H$ |
| 4 | DO |
| 5 | /LAT |
| 6 | CLK |
| 7 | $V_{DD}$ |
| 8 | STB1 |
| 9 | STB2 |
| 10 | STB3 |
| 11 | TM |
| 12 | TM |
| 13 | P-GND |
| 14 | P-GND |
| 15 | P-GND |
| 16 | P-GND |
| 17 | P-GND |
| 18 | L-GND |
| 19 | /AEO1 |
| 20 | /AEO2 |
| 21 | STB4 |
| 22 | STB5 |
| 23 | N.C. |
| 24 | N.C. |
| 25 | DI |
| 26 | $V_H$ |
| 27 | $V_H$ |
| 28 | $V_H$ |

Figure 8A

| No. | SIGNAL |
|---|---|
| 1 | $V_H$ |
| 2 | $V_H$ |
| 3 | $V_H$ |
| 4 | DATA OUT |
| 5 | N.C. |
| 6 | N.C. |
| 7 | $V_{DD}$ |
| 8 | $\overline{\text{STROBE 2}}$ |
| 9 | N.C. |
| 10 | N.C. |
| 11 | THERMISTOR |
| 12 | GND |
| 13 | GND |
| 14 | GND |
| 15 | GND |
| 16 | GND |
| 17 | GND |
| 18 | N.C. |
| 19 | N.C. |
| 20 | N.C. |
| 21 | $\overline{\text{STROBE 1}}$ |
| 22 | CLOCK |
| 23 | DATA IN |
| 24 | $\overline{\text{LATCH}}$ |
| 25 | N.C. |
| 26 | $V_H$ |
| 27 | $V_H$ |
| 28 | $V_H$ |
| 29 | GROUND TAB |
| 30 | GROUND TAB |

Figure 8B

METHOD AND APPARATUS FOR PRINTHEAD CONTROL

CROSS REFERENCE TO RELATED APPLICATIONS

This application claims the benefit of priority to U.S. Provisional Application No. 61/583,428, which was filed Jan. 5, 2012 and is hereby incorporated by reference in its entirety.

TECHNICAL FIELD

The present invention relates generally to printing devices. Some aspects of the invention relate specifically to thermal printing devices while other aspects may be implemented in various other types of printing devices.

BACKGROUND

Thermal printers are used in a variety of different applications, such as, for example, receipt dispensing systems for ATMs and point-of-sale devices. Various types of thermal printers have been developed including direct thermal printers, thermal transfer printers, dye-sublimation thermal printers, or the like. To generate a printed media, such as a receipt, a printer may include a thermal printhead that applies energy to series of printhead dots (e.g., heating elements) to print respective dot images on the media. Printheads may have varying sizes, shapes, and may have varying numbers of printhead dots depending on the printer application. For example, a printer application that requires two-inch wide media may require a printhead having 384 dots that are capable of printing a 2-inch wide print line (i.e., a line of print that spans across the media, often perpendicular to the direction in which the media feeds). Applying energy to the dots of the thermal printhead heats the dots and permits the heat energy generated by the dots to be transferred to the media to image (i.e., print) the media. Thermal print media (e.g., thermochromic paper) can be designed and manufactured such that when the media receives a threshold amount of energy, the media may change color, for example, from white to black. Other types of print media may alternatively be used that are designed and optimized for grayscale printing. In some instances, the media may be synthetic, rather than being paper-based. A synthetic media may be configured to change from clear to black in response to absorbing a threshold amount of heat energy.

Because printheads can have a linear series of printhead dots that span the width of the media, thermal printers often print one line of a print job at a time. Based on the content to be printed, different printhead dots for a given line may be turned on or off. For example, if a solid line is to be printed across the media, then all of the printhead dots may be turned on to print that line as a solid line of dot images. Energizing the printhead dots can be referred to as strobing the dots, and the time needed to strobe the dots for a particular print event is referred to as the strobe time. Each line of a given print job may be printed by moving the media, via a motor, relative to the printhead and changing which printhead dots are turned on and which printhead dots are turned off. The speed at which the media is printed is often measured in inches per second, or ips, which can be related to the line strobe time required for printing individual lines in a given print job.

Applicant has identified a number of deficiencies and problems associated with the printing of labels or other media. Through applied effort, ingenuity, and innovation, Applicant has solved many of these identified problems by developing a solution that is embodied by the present invention, which is described in detail below.

BRIEF SUMMARY

A method, apparatus, and computer program product are provided for controlling a printing device. In some embodiments, a method is provided for analyzing a neighbor memory layout for a selected line dot state, wherein the neighbor memory layout comprises the selected line dot state and a plurality of neighboring line dot states, and based on the analysis, determining a frame dot state sequence for the selected line dot state, wherein the frame dot state sequence comprises a plurality of frame dot states indicating a state of a printhead dot during printing.

The neighboring line dot states may be identified based on spatial proximity to the selected line dot state and/or temporal proximity to the selected line dot state. In some embodiments the method may further include determining a layout signature by generating a binary number representative of the selected line dot state and the neighboring line dot states, and determining the frame dot state sequence based on the layout signature. In some embodiments, the method may further include converting the binary number to a hexadecimal number, identifying an address of a frame dot state sequence associated with the hexadecimal number, and determining the frame dot sequence based on the address.

In some embodiments, the method may further include retrieving a print data line, generating at least two frames representative of the print data line, transmitting the at least two frames to a printhead for printing to a media, and signaling to a motor to move the media. The print data lines may be retrieved from a first-in first-out memory buffer, and/or the at least two frames may be stored in a first-in first-out memory buffer.

In some embodiments, a computer program product is provided, including at least one non-transitory computer-readable storage medium having computer-executable program code instructions stored therein, the computer-executable program code instructions comprising program code instructions to analyze a neighbor memory layout for a selected line dot state, wherein the neighbor memory layout comprises the selected line dot state and a plurality of neighboring line dot states, and based on the analysis, determine a frame dot state sequence for the selected line dot state, wherein the frame dot state sequence comprises a plurality of frame dot states indicating a state of a printhead dot during printing.

In some embodiments, a printing device is provided, comprising processing circuitry configured to analyze a neighbor memory layout for a selected line dot state, wherein the neighbor memory layout comprises the selected line dot state and a plurality of neighboring line dot states, and based on the analysis, determine a frame dot state sequence for the selected line dot state, wherein the frame dot state sequence comprises a plurality of frame dot states indicating a state of a printhead dot during printing.

In some embodiments, a method is provided for accessing a plurality of print data lines in a memory device, wherein a print data line indicates where dot images will be printed across a line of a media, determining respective line strobe times and maximum motor speeds for the print data lines, determining a maximum step in motor speed from a printing of one line to a printing of an adjacent line, and determining an actual motor speed for a selected print data line based on the maximum motor speed for the selected print data line, the maximum step in motor speed, and the respective line strobe times.

In some embodiments, the method may further include identifying a longest strobe time from the respective strobe times, wherein the determining an actual motor speed for a selected print data line is further based on the longest strobe time. The method may include retrieving the selected print data line from a first-in first-out memory buffer. In some embodiments, determining the maximum step in motor speed is based on at least on a number of print data lines in the first-in first-out memory buffer.

A computer program product is also provided, comprising at least one non-transitory computer-readable storage medium having computer-executable program code instructions stored therein, the computer-executable program code instructions comprising program code instructions to access a plurality of print data lines in a memory device, wherein a print data line indicates where dot images will be printed across a line of a media, determine respective line strobe times and maximum motor speeds for the print data lines, determine a maximum step in motor speed from a printing of one line to a printing of an adjacent line, determine an actual motor speed for a selected print data line based on the maximum motor speed for the selected print data line, the maximum step in motor speed, and the respective line strobe times.

In some embodiments, a printing device is provided, comprising processing circuitry configured to access a plurality of print data lines in a memory device, wherein a print data line indicates where dot images will be printed across a line of a media, determine respective line strobe times and maximum motor speeds for the print data lines, determine a maximum step in motor speed from a printing of one line to a printing of an adjacent line, determine an actual motor speed for a selected print data line based on the maximum motor speed for the selected print data line, the maximum step in motor speed, and the respective line strobe times.

In some embodiments, a method is provided for transmitting a signal to a printhead on a print engine output pin, monitoring a print engine input pin for a response, and in an instance a response is received, determining a printhead type based on the output pin. In an instance a response is not received, the method includes transmitting a signal to the printhead on a different print engine output pin.

In some embodiments, a computer program product is provided, comprising at least one non-transitory computer-readable storage medium having computer-executable program code instructions stored therein, the computer-executable program code instructions comprising program code instructions to transmit a signal to a printhead on a print engine output pin, monitor a print engine input pin for a response, and in an instance a response is received, determine a printhead type based on the output pin.

In some embodiments, a printing device is provided, with processing circuitry configured to transmit a signal to a printhead on a print engine output pin, monitor a print engine input pin for a response, and in an instance a response is received, determine a printhead type based on the output pin.

BRIEF DESCRIPTION OF THE DRAWINGS

Reference will hereinafter be made to the accompanying drawings which are not necessarily drawn to scale, and wherein:

FIG. 2A illustrates example print data lines in accordance with some example embodiments;

FIG. 2B is an example neighbor memory layout schematic in accordance with some example embodiments;

FIG. 2C illustrates an example neighbor memory layout in accordance with some example embodiments;

FIG. 2D illustrates a layout signature presented as a binary number in accordance with some example embodiments;

FIG. 3A is a table of addresses of frame dot state sequences in accordance with some example embodiments;

FIG. 3B is a table of frame dot state sequences in accordance with some example embodiments;

FIG. 4 illustrates an example compilation of frame dot state sequences;

FIGS. 8A and 8B are example pin configurations for printheads in accordance with some example embodiments;

DETAILED DESCRIPTION

Figure 1A:
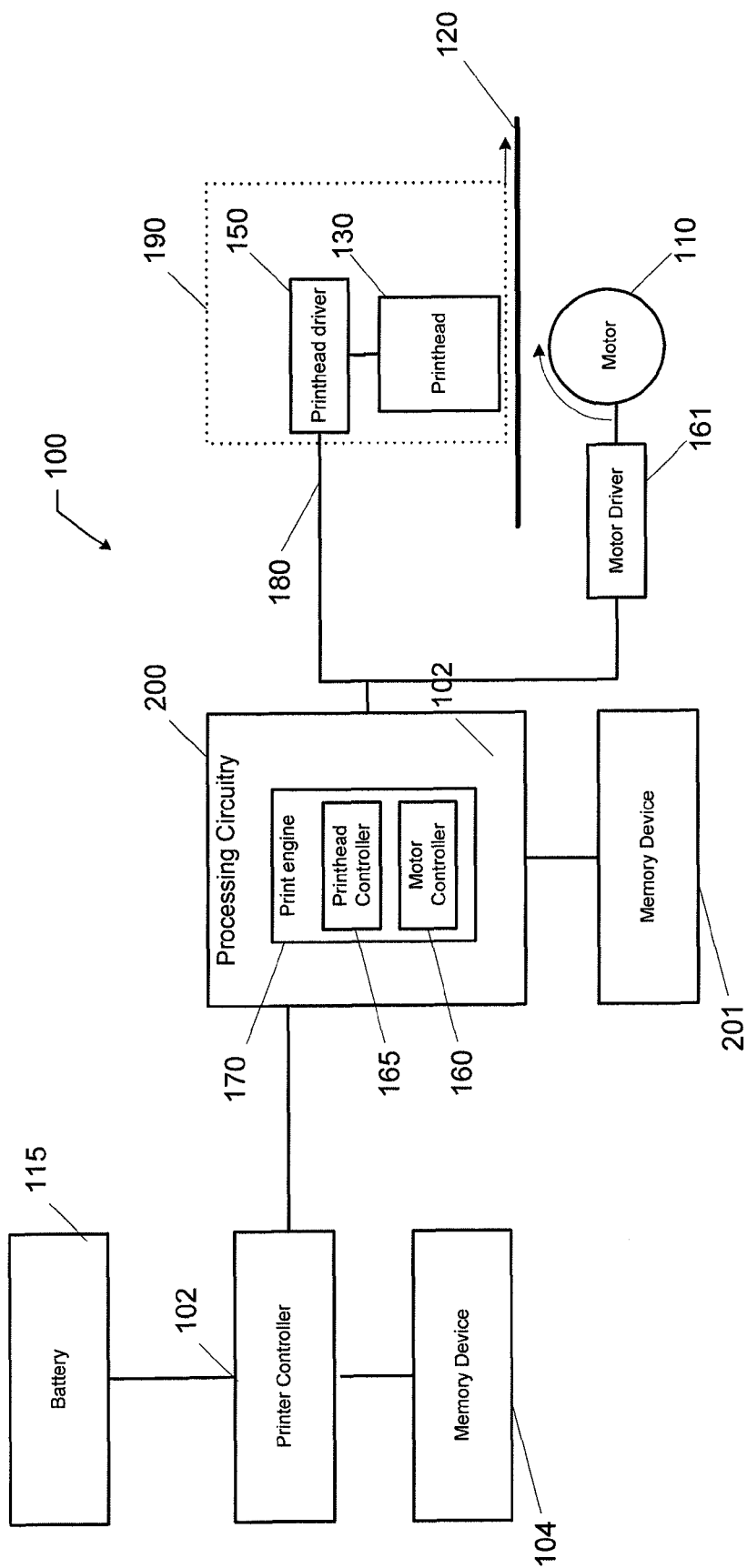
FIG. 1A is a schematic block diagram of an example printing device in accordance with some example embodiments.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1A is a schematic block diagram of an example printing device 100 according to some example embodiments. The printing device 100 may be a direct thermal printer, a thermal transfer printer, or the like. The printing device 100 may be a stand-alone unit (e.g., a handheld printer) or may be integrated into a larger apparatus, such as an ATM, gas pump, point-of-sale device, or the like.

A printhead assembly 190 may include a printhead driver 150 and a printhead 130. In embodiments in which print device 100 is embodied as a thermal printer, the printhead driver 150 may be a hardware device configured to receive signals in the form of, for example, data to be printed, and, based on the data, energize (e.g., heat) dots of the printhead 130. According to various example embodiments, the print engine 170 may be configured to control the dots of the printhead to ensure that a sufficient amount of energy is transferred to a media to properly print a line. Depending on the type of media, a threshold number of joules per square inch or Watt*seconds per square inch may be needed to cause the media to have a chemical reaction that changes the appearance of the media (e.g., from white to black).

Figure 1B:
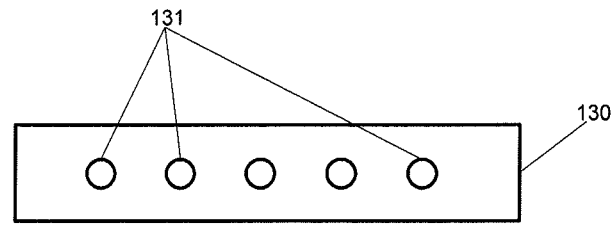
FIG. 1B is a schematic representation of an example printhead in accordance with some example embodiments.

FIG. 1B is a schematic representation of an example printhead in accordance with some example embodiments. The example printhead 130 has five printhead dots 131. As described above, a "printhead dot" may be considered an element of the printhead capable of applying energy so as to print to a media. As was noted above and will be apparent to one of ordinary skill in the art, the inventive concepts herein described may be applied to printheads having all manner of sizes and dot structures (e.g., 384 dots, etc.). When positioned in the printing device 100, the printhead dots 131 may interface with a printable media to heat the media and thereby print respective dot images to the media. A "dot state" may therefore be considered an indication of whether or not a particular dot will be energized. A dot state of 'on' or '1' may therefore indicated the particular dot is to be energized, while a dot state of 'off' or '0' may indicate the particular dot should not be energized. As described above, the energizing of the dots may be referred to as "strobing" the dots, and the length of time taken to strobe the dots during the printing of any one line may be considered the "line strobe time."

Figure 1C:
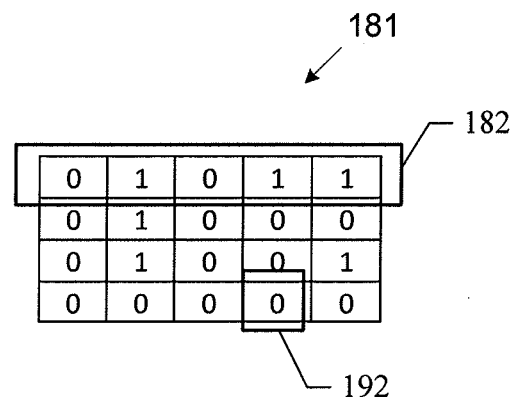
FIG. 1C illustrates example print job information in accordance with some example embodiments.
Figure 1D:
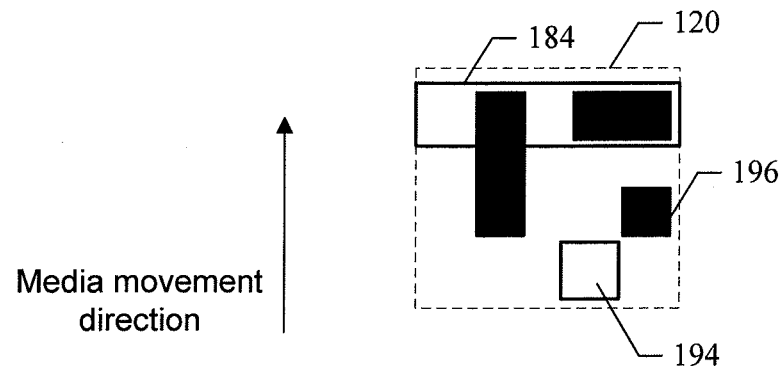
FIG. 1D illustrates an example media printed to using the print job information of FIG. 1C in accordance with some example embodiments.

FIG. 1C illustrates example print job information 181, including print data lines such as print data line 182. "Print job information" may be considered any information indicating where on the media dot images should be printed. In this example, the print job information 181 is provided as print data lines. A "print data line," such as print data line 182 may be considered any information indicating where dot images (e.g., a black mark) should be printed across a line of the media, and in this example is provided by a series of 1's and/or 0's. A '1' indicates a dot image should be printed, and a '0' indicates a dot image should not be printed. As such, a "line dot state" 192, may be considered any information indicating whether a dot image should be printed for a given line and printhead dot. In this example, a 1 may indicate the line dot state is on (e.g., a dot image should be printed) and a 0 may indicate the line dot state is off (e.g., a dot image should not be printed). For example, a printed line of whitespace may have line dot states for each of five dots defined as 0, 0, 0, 0, 0, respectively, and a printed line that is a solid black line may have line dot states for each of five dots defined as 1, 1, 1, 1, 1, FIG. 1D illustrates an example media 120 that may be printed to using the print job information 181 of FIG. 1C. Note that dot images are printed in areas corresponding to a '1' in the print data line. A "dot image" may be considered an area of the media 120 that has been printed (e.g., left a mark on the media), such as dot image 196. Unprinted dot image areas on the media 120 correspond to a '0' in the print data line. An "unprinted dot image area" may therefore be considered an area of the media 120 where a dot image has not been printed, such as the unprinted dot image area 194 (which corresponds to line dot state 192). A "printed line," such as printed line 184, may therefore be considered a collection of dot images and/or unprinted dot image areas on the media 120, often configured perpendicular to the media movement direction. As such, it will be appreciated that a "printed line," in some embodiments, may actually comprise only unprinted dot image areas (e.g., an area of white space on a white media). Printed line 184 is an example printed line corresponding to the print data line 182. It will be appreciated that while the dot images of FIG. 1D appear square, the dot images produced by the printhead dots 131 may be any shape and/or size.

Returning to FIG. 1A, various components of the printing device 100 may be controlled by a printer controller 102, while functions relating specifically to processing print data lines may be controlled by processing circuitry 200. In some embodiments, the printer controller 102 and/or the processing circuitry 200, may be embodied as or comprise a circuit chip. The circuit chip may constitute means for performing one or more operations for providing the functionalities described herein.

In some example embodiments, the printer controller 102 and/or processing circuitry 200 may access or otherwise include memory devices 104 and 201, respectively. In some example embodiments, the printer controller 102 and/or processing circuitry 200 may be embodied as a circuit chip (e.g., an integrated circuit chip) configured (e.g., with hardware, software, or a combination of hardware and software) to perform operations described herein. The printer controller 102 and/or processing circuitry 200 may perform some or all of the processing functionalities introduced above and described in further detail hereinafter.

The printer controller 102 and/or processing circuitry 200 may be embodied in a number of different ways. For example, the printer controller 102 and/or processing circuitry 200 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In some embodiments, the printer controller 102 and/or processing circuitry 200 may comprise a plurality of processors. The plurality of processors may be in operative communication with each other and may be collectively configured to perform one or more functionalities of the printing device 100 as described herein.

In some example embodiments, the printer controller 102 and/or processing circuitry 200 may be configured to execute instructions stored in the memory devices 104 and/or 201, respectively. In some example embodiments, memory device 104 and/or 201 may include one or more non-transitory memory devices such as, for example, volatile and/or non-volatile memory that may be either fixed or removable. In some embodiments, the memory device 104 and/or 201 may be internal to the hardware embodying the printer controller 102 and/or processing circuitry 200, respectively, such as an ASIC, FPGA, or the like. In this regard, the memory device 104 and/or 201 may comprise a non-transitory computer-readable storage medium. It will be appreciated that while the memory device 104 and/or 201 is illustrated as a single memory, the memory device 104 and/or 201 may comprise a plurality of memories. The memory device 104 and/or 201 may be configured to store information, data, applications, instructions and/or the like for enabling the printer controller 102 and/or processing circuitry 200, to respectively carry out various functions in accordance with one or more example embodiments. For example, the memory device 104 and/or 201 may be configured to store print data lines. As described herein, various manipulations of the print data lines may be performed, which may be stored on memory device 104 and/or 201. The memory device 104 and/or 201 may be additionally configured to buffer input data for processing by the printer controller 102 and/or processing circuitry 200. Additionally or alternatively, the memory device 104 and/or 201 may be configured to store instructions for execution by the printer control 102 and/or processing circuitry 200. As yet another alternative, the memory device 104 and/or 201 may include one or more databases that may store a variety of data. Among the contents of the memory device 104 and/or 201, applications may be stored for execution by the printer controller 102 and/or processing circuitry 200 to carry out the functionality associated with each respective application.

As such, whether configured by hardware or by a combination of hardware and software, the printer controller 102 and/or processing circuitry 200 may be capable of performing operations according to embodiments of the present invention while configured accordingly. Thus, for example, when the printer controller 102 and/or processing circuitry 200 is embodied as an ASIC, FPGA, or the like, the printer controller 102 and/or processing circuitry 200 may be specifically configured hardware for conducting the operations described herein. Alternatively, as another example, when the printer controller 102 and/or processing circuitry 200 is embodied as an executor of software instructions, the instructions may specifically configure the printer controller 102 and/or processing circuitry 200 to perform one or more operations described herein.

As such, the printer controller 102 may be configured to control various components of the printing device 100 such as a display panels, power supplies, and/or the like. In some embodiments, the printer controller 102 may be configured to receive a print job from a host system, and store print job information on memory device 104. The printer controller 102 may process the print job information to generate print data lines, which may be transmitted to processing circuitry 200. Processing circuitry 200 may include print engine 170, for processing the print data lines. The print engine 170 may therefore be configured to receive print data lines from the printer controller 102, and store and access the print data lines on memory device 201. Additionally or alternatively, in some embodiments, the printer controller 102 may be configured to transmit a bit map image, for example, to processing circuitry 200, and the print engine 170 may generate the print data lines based on the image, and store and/or access the print data lines on memory device 201. In some embodiments, the printer controller 102 may be disposed in communication with a battery 115 for powering the printer controller 102 and one or more additional printer components.

As such, the print engine 170 may process the print line data, and instruct the printhead driver 150 to cause the printhead 130 to produce a printed line on a media. Further, the printhead controller 165 may be configured to generate and send commands to the printhead driver 150 indicating the dot states and strobe times to be used in operating the printhead 130 to produce a printed line. In other words, the printhead controller 165 may be configured to provide inputs to the printhead driver 150 to cause the printerhead driver 150 to control the operation of the dots 131 of the printhead 130 to print to the media 120. Accordingly, printhead controller 165 may communicate with printhead assembly 190 via data lines 180.

The print engine 170 may also include a motor controller 160, which may interface with the motor driver 161 to control the operation of the motor 110. In this regard, the motor controller 160 may send instructions to the motor driver 161, which in turn controls the speed of the motor. The motor controller 160 may therefore coordinate the movement of the media into position to be printed. The print engine 170 may control or otherwise provide instructions to printhead driver 150 and motor driver 161, via the printhead controller 165 and motor controller 160, to ensure that the operations of the printhead 130 and the movement of media relative to the printhead 130 are correctly synced. Further, motor 110 may cause media 120 to move from left to right through the printing device 100 and relative to the printhead 130 at a speed that is controlled by the motor controller 160. More particularly, the media 120 may be moved by a platen (not shown) of the printing device 100, where the platen is driven by the motor 110, possibly via one or more gears that are operative with the platen.

In this regard, the functionalities described herein may be performed by the processing circuitry 200 controlled by the print engine 170, alone or in conjunction with processors of the printhead controller 165 and the motor controller 160. As such, printhead controller 150 and motor controller 160 may be implemented using the same or similar hardware as the print engine 170.

Neighboring Dot Configurations and Frames

In some example embodiments, thermal printing devices, such as printing device 100, may be used to print barcodes to labels, receipts, cards, or other items. Due to the high speed and precision required in many commercial and/or industrial barcode applications, printed barcodes should be high quality, and free of blurred images, stray dots, or bleeding. Thermal printing devices are often lightweight and compact, making them ideal for mobile applications (e.g. handheld printing devices), or the like. Embodiments of the claimed invention may provide efficient power usage in thermal printing devices, in order to provide long lasting battery life without adding significant weight and/or bulk to the device, while still maintaining the precision required to print a barcode.

As such, according to various example embodiments, a print engine, (e.g., print engine 170) may be configured to divide a print data line across a number of frames. Although the print data line may be the lowest level portion of an image distinguishable by the printer controller 102, the print engine 170 may further divide a print data line into a number of frames, indicating frame dot states for every printhead dot of the printhead 130. A "frame dot state" may therefore be considered the state of a printhead dot during printing of a frame. A "frame" may be considered a collection of frame dot states for a particular printhead dot during printing of a portion of a line. A frame dot state of '1' or 'on' may indicate that the dot will be energized, and a frame dot state of '0' or 'off' may indicate that the dot will not be energized, according to some example embodiments. A "frame dot state sequence" may be considered a collection of frame dot states, including a frame dot state for every dot of the associated print data line.

The print engine 170 may therefore advantageously configure the printhead 130 to strobe a printhead dot, for example, for only half of the frames representing a print data line, whereas a printing device not utilizing a multi-frame line printing scheme, may strobe the dot for the duration of the line strobe time, thereby using more energy, and potentially overheating the dot. Overheating a dot may cause a dot image to inadvertently be printed where printing is not intended. Although a printhead dot may not be strobed in a subsequent line, excess heat from printing of a previous dot image may cause printing of a stray or blurred dot. Utilizing frames may allow the print engine 170 to have more control over the temperature of the dots, and therefore more efficiently distribute energy.

The print engine 170 may analyze the print job information stored in a memory device (e.g., memory device 201) to divide a print data line into a number of frames, and determine frame dot state sequences. The line strobe time may be determined based on the content to be printed on that line. According to some example embodiments, determining the line strobe time for the content of the line may be determined based on a specification for the printhead that is being used. Based on the line strobe time, a duration for strobing the dots of a frame, referred to as the "frame strobe time," can be determined. According to some example embodiments, a frame strobe time may be determined by dividing the line strobe time by the number of frames, where each frame may have the same duration. In some embodiments, the frame strobe time need not be uniform across the frames. In order for a dot image to be printed, the dot may need to provide sufficient energy in the form of heat to react with the media, which may require the dot to be on for a number of consecutive frames, but not necessarily for all of the frames associated with a given line. Accordingly, in some instances, a dot used to print a dot image that is part of a line may be strobed multiple times during the printing of the printed line. Additionally or alternatively, movement of the media may be performed at the frame level, such that the media may move from frame-to-frame in increments that are less than that of a full printed line (e.g., steps that are ⅛ of a printed line).

According to some example embodiments, a print data line may be divided into eight frames, although any number of frames may be used. The frame dot state sequence for each frame may be set for the purpose of printing the associated printed line, for pre-heating the dot for printing a subsequent printed line, for dot cool down for history control, or the like.

Different frame dot state sequences may be used under different circumstances. To determine which frame dot state sequence to use, an analysis of print data lines may be considered. More specifically, a determination of which frame dot state to use for a particular printhead dot may be based on an analysis of the line dot states of the particular printhead dot and its neighboring line dot states. "Neighboring line dot states" to a particular line dot state may be considered any line dot state in close spatial and/or temporal proximity. A line dot state in close "spatial" proximity may be considered a line dot state of a printhead dot in the same print data line, and a line dot state in close "temporal" proximity may be a line dot state in a substantially close print data line, such as a print data line representing a printed line before or after a printed line represented by a print data line comprising the particular line dot state of interest. As such, in some embodiments, a neighboring line dot state in close temporal proximity to a particular line dot state may be associated with the same dot of the printhead 130.

To analyze the neighboring line dot states, in accordance with some example embodiments, the data describing a given print job stored in a memory device, such as memory device 201, may be considered by the print engine 170. FIG. 2B is an example neighbor memory layout schematic for considering neighboring line dot states. For a given dot, the print engine 170 may access and/or otherwise receive a neighbor memory layout, that may be provided by parsing print data lines from a print data line FIFO (first-in first-out) memory buffer, for example. A "neighbor memory layout" for a particular dot may therefore be considered a collection of line dot states for the particular dot and its neighboring dots.

FIG. 2A illustrates example print data lines 310 that are stored in a memory block of, for example, the memory device 201. As describe above, the memory block may be a FIFO memory buffer, fed by printer controller 102, for example. Additionally or alternatively, the print data line FIFO memory buffer may be fed by the processing circuitry 200, upon parsing a received bit map image, for example, from printer controller 102. The print data lines 310 may indicate the content of each line that is to be printed by including the line dot states for each of five dots for the next sixteen lines (i.e., Line 1 to Line 16). The print data lines 310 may be analyzed by the print engine 170 to determine corresponding frame dot state sequences.

The memory block storing print data lines 310 may be viewed by the printer controller 102 as a write-only memory that can be written to via Direct Memory Access (DMA). Data may be transferred into the memory block in, for example, under control of the print engine 170. The print data line FIFO memory buffer may be 16 lines deep to assure that the printer controller 102 is able to keep the print engine 170 fed with data in the event of communications error. If the print data line FIFO memory buffer runs empty, the printing device 100 may stop printing, which can result in poor print quality and intermittent paper motion.

In one embodiment, if the selected line dot state is at A5, the line dot states at A0 through A4 may be retrieved and evaluated to determine an appropriate frame dot state sequence for the dot. In FIG. 2B, the neighbor memory layout schematic indicates that the value at A5 is the line dot state of the selected line dot state for the current line. A0 represents the line dot state of the dot to the right of the selected line dot state during the current line. A1 represents the line dot state of the dot to the left of the selected line dot state during the current line. As such, line dot states represented by A0 and A1 may be considered spatially related neighboring dots. A2 represents the line dot state of the selected line dot state during the printing of the previous or past line. A4 represents the line dot state of the selected line dot state during the printing of the next line. Finally, the value at A3 is the line dot state of the selected line dot state during the printing of a line that is two lines in the future relative to the current line. According to various embodiments, the values of the line dot states in these positions of the neighbor memory layout may be considered when determining a frame dot state sequence for the selected line dot state.

Turning to FIG. 2C, if the selected line dot state is at 311 of FIG. 2A, the neighbor memory layout of FIG. 2C may be considered. In this example, the selected line dot state 311 has both spatial and temporal neighbor line dot states as indicated by the neighbor memory layout schematic of FIG. 2B, however, for line dot states on the edges of the line, a neighboring spatial line dot state may not exist. In this situation, a fictitious line dot state of 0 may be considered. Similarly, line dot states in the first and last lines may not have neighboring temporal line dot states, and a fictitious line dot state of 0 may be considered.

Based on the neighbor memory layout, such as the neighbor memory layout of FIG. 2C, a layout signature can be derived. Various techniques can be used to determine a layout signature. For example, in one embodiment, the values of the neighbors may be concatenated or sequenced to form a binary number that is the layout signature. Here, the binary number for the layout signature may be a six-bit number based on the defined positions in the memory layout. By applying the neighbor memory layout schematic of FIG. 2B to the neighbor memory layout of FIG. 2C, a binary number can be generated, as shown in FIG. 2D. In this example, the binary number representing the line dot states of the selected line dot state and the neighboring dots is 010000 ($\underline{0}*2^5+\underline{1}*2^4+\underline{0}*2^3+\underline{0}*2^2+\underline{0}*2^1+\underline{0}*2^0$). The binary number may be stored on memory device 201, for example.

Figures 3A, 3B:
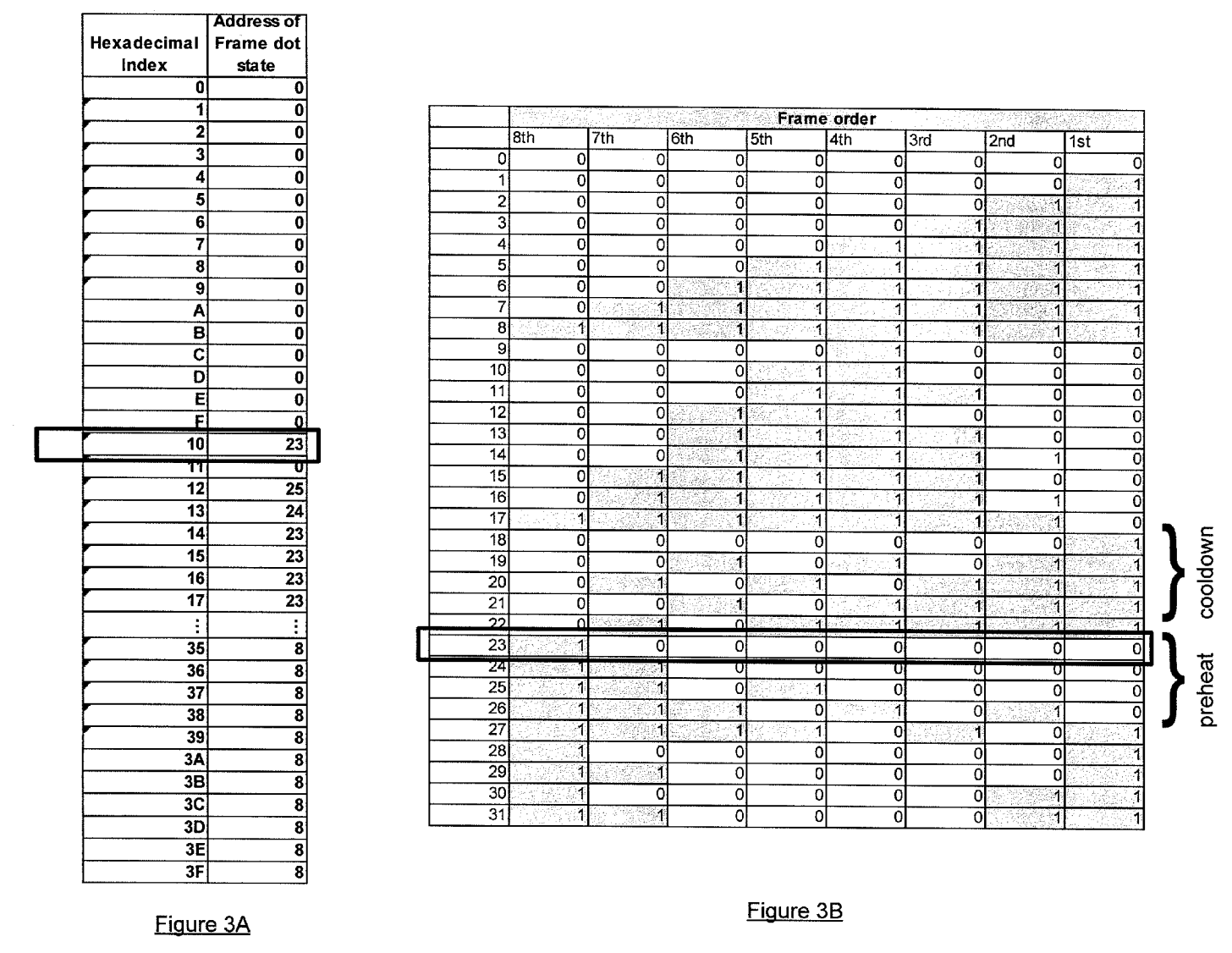

Given the binary number, the print engine 170 may convert the binary number to hexadecimal, in this example, hexadecimal 10 ($\underline{1}*16^1+\underline{0}*16^0$). FIG. 3A is an example table of frame dot state sequence addresses that may be stored to memory device 201, for example. By referencing hexadecimal 10 in the table of 3A, address 23 is returned. In some embodiments, the print engine 170 may convert a binary number to decimal and reference a frame dot state sequence address table by the decimal equivalent. In some embodiments, no conversion may be necessary, and a frame dot state sequence may be identified by the binary number itself.

FIG. 3B illustrates an example frame dot state sequence table, providing 32 frame dot state sequences that can be selected for a selected line dot state. In the example process being considered with respect to selected line dot state 311, address 23 may be referenced. As such, the frame dot state sequence for a selected line dot state at 311 is 1, 0, 0, 0, 0, 0, 0, 0, where the sequence is listed with the frame dot state of the first frame on the right of the sequence and the frame dot state of the last frame on the left. This sequence may be used because the next line dot state for the selected line dot state is a 1, and therefore the 1 in the last frame of the sequence can be used to preheat the dot for printing a dot image during the next line. In other words, strobing the dot in the $8^{th}$ frame only will not cause the dot to reach a temperature resulting in a dot image in line 2, however the dot may be strobed in the final frame in order to preheat for printing of a dot image in line 3. The preheat frame dot state sequence may therefore reduce the required energy needed during printing of line 3, allowing for more efficient energy distribution across frames and print data lines.

Frame dot state sequences at addresses 23-27 may provide for various preheating functionality. Frame dot state sequences at addresses 18-22 may provide for a cooldown. A cooldown may be beneficial in situations where excess heat remains from the printing of a previous dot image, and the dot may be cooled to prevent a stray dot image in subsequent printed lines, where a dot image need not be printed. Additional frame dot sequences may be provided to enable printing of uniquely shaped dot images. For example, a frame dot sequence may be provided to produce tear drop shaped dot images, box shaped dot images, center justified dot images, and/or the like. The frame dot state sequences of FIG. 3A are provided for example, and it will be appreciated that any number of frame dot state sequences may be utilized.

As mentioned above, frame dot state sequences may be determined for each line dot state of a given print data line. FIG. 4 illustrates an example compilation of the frame dot state sequences for each of the line dot states of Line 2 in FIG. 2A. Note that the frame dot state sequence for Dot 3, which was the selected line dot state analyzed above, is identified at 400. During the printing of Line 2, the dots during each frame will be strobed as appropriate, according to their respective frame dot state sequences. For example, during Frame 1, Dot 1 and Dot 5 will be strobed. During Frame 2, Dot 1 and Dot 5 will again be strobed, and so on until Dots 1, 2, 3, and 5 are strobed during Frame 8 when printing of Line 2 is complete.

According to various example embodiments, after determining the frame dot sequences for each of the line dot states, the frame dot state sequences, such as those of FIG. 4, may be loaded into a frame FIFO memory buffer, and stored on memory device 201, for example. According to some example embodiments, the frame FIFO memory buffer may be configured to store 16 frames, or 2 printed lines worth of frame dot state sequences, for example, for lines to be printed as a series of 8 frames. The information in the frame FIFO memory buffer may be sent to the printhead 130 via the printhead controller 165. A framer function of the print engine 170 may control the loading of the printhead 130 and signaling to step the motor, as further described below.

When printing a line, the printhead driver 150 may control the strobing of the dots based on instructions provided to the printhead driver 150 by the print engine 170. The frame strobe time can vary based on temperature, voltage, and frame dot state sequences, but may be bounded by the frame time. The frame strobe time may therefore be less than or equal to the frame time. According to some example embodiments, the frame strobe time may be correlated to the motor speed. According to some example embodiments, the frame strobe time for each of the frames, and the associated motor speed, may be adjusted to accommodate the longest of the pre-calculated frame strobe times.

Frame strobe times for the frames may be calculated on a frame-by-frame basis. The "dot density," or number of dots strobed in a given fame, can change, and therefore impact the frame strobe times. Given this dynamic, the print engine 170 may consider the dot density in a frame and calculate the required frame strobe time for that frame during, for example, the printhead latch time. In some embodiments, printheads are constructed as double buffered latches, allowing loading of an input buffer with new data, (e.g., frames) while data from the output buffer is being strobed. The printhead latch time is therefore defined as the time it takes to transfer the data from an input buffer to the output buffer. A frame strobe time may therefore be calculated during the printhead latch time. The print engine 170 may therefore compensate for slight changes in dot density due to frame dot state sequences caused by variables such as preheat.

According to some example embodiments, a base strobe time may be derived from the specification for the printhead being used, and considered in determining individual frame strobe times. The base strobe time may be considered the line strobe time required to print a particular optical density of a dot. In some embodiments, tone may be adjusted to lighten and/or darken the dot images. If a dot image were to be made darker, the print engine 170 may increase a base strobe time, by a requested percent or multiplier, for example, to calculate a relatively longer frame strobe time, resulting in a darker dot image. Conversely, a base strobe time may be decreased, by a specified percent, for example, to calculate a relatively shorter frame time to produce a lighter dot image. In an example embodiment, a frame strobe time capable of achieving a tone of 100 may be achieved by multiplying a base strobe time by 2. A tone of 200 could be achieved by multiplying a base strobe by 3, for example.

In some embodiments, temperature reading(s) and battery level(s) may be measured by the print controller 102 and transmitted to the print engine 170 with every new print data line, for example. As such, temperature and battery level(s) may also be considered in calculating frame strobe times.

According to some example embodiments, once the line strobe time has been determined for the line, the print engine may be configured to divide the strobe time into eight separate periods, one for each frame. Further, the print engine may bias the strobe time to the earlier frames, later frames, middle frames, or the like. According to some example embodiments, the print engine 170 may be configured to cause a pulse strobe of the printhead dot between frames to keep the printhead dot warm, or the print engine 170 may leave the printhead dot off until the next frame.

According to some example embodiments, turning a dot on may involve strobing the dot using a pulse width modulated signal. The width of the pulse may be based on the motor speed at a given time. For example, a particular printhead dot may need to be heated more aggressively when the motor 110 is moving more quickly. As such, as the motor speed is increased the portion of the pulse width modulated signal that is high or on may be increased relative to the speed. In other situations, a particular printhead dot may require less heat when the media is moving quickly since the printhead dot has less time to cool off following printing of a previous line, so that as the motor speed is increased the portion of the pulse width modulated signal that is high or on may be decreased relative to the speed of the media. According to some example embodiments, this modulation may be partially based on other operating characteristics of the printer, including characteristics of the power supply, the type of media, or operating temperature. When the printer is powered by a battery, parameters such as battery type, battery charge, battery age, and battery temperature may influence printhead dot heating characteristics and thus may be taken into account when establishing the modulation signal. The temperature of the media (ribbon or printable substrate), temperature of the printhead, and ambient temperature in vicinity of the printhead may each influence printhead dot heating and cooling characteristics and may also be taken into account when determining the modulation signal. The material, dimensions, density, specific heat, surface finish, and composition of the media, ribbon, adhesive, or liner may also influence printhead dot heating and cooling characteristics, the speed and acceleration of the media with respect to the printhead. These characteristics may also be taken into account when establishing the modulation signal. The print mechanism of the printer, including the printhead, the platen roller, and various media guides and sensors may further influence printhead dot heating and cooling characteristics and/or the speed and acceleration of the media with respect to the printhead, and may also be taken into account when establishing the modulation signal.

According to some example embodiments, the print engine 170 may be configured to move the motor 110 and therefore the media 120 on a per-frame basis. In this regard, the print engine 170 may cause slight movements (e.g., less than a movement between frames) of the media in each frame. As such, the print engine 170 may direct the printhead 130 to strobe the dots using particular frame dot state sequences and frame strobe times, and direct the motor 110 to control motor movements to produce a desired printed line. Such synchronization may additionally provide for precise printing of tear drop shaped dot images, box shaped dot images, center justified dot images, and/or the like.

Figure 5:
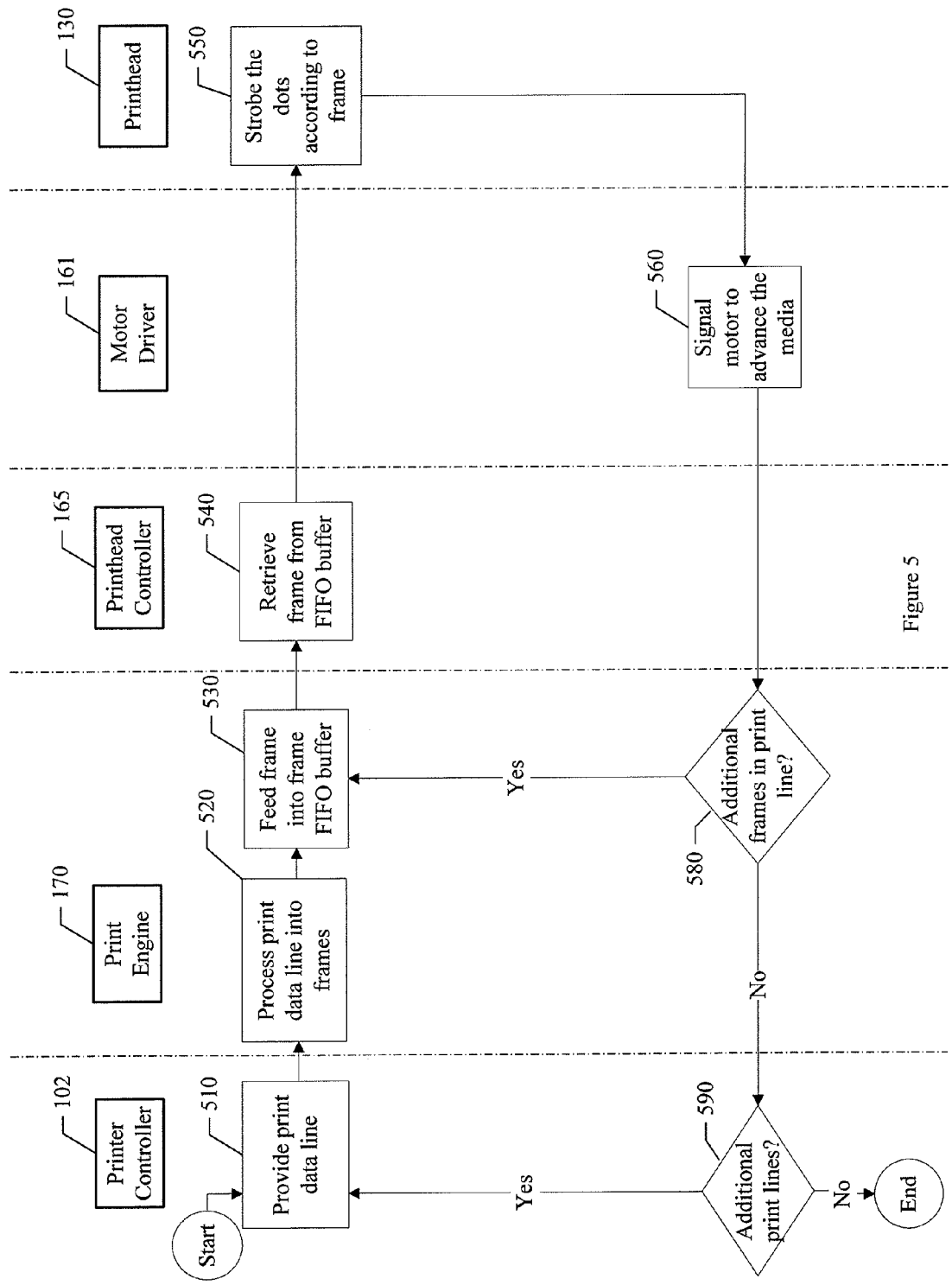
FIG. 5 is a flowchart of a process for producing a printed line using successive frames in accordance with some example embodiments.

FIG. 5 is a flowchart of the process that an example embodiment may implement in order to produce a printed line using successive frames. At operation 510, a print data line may be provided from printer control 102, such as the print data lines provided at 310. As described above, a print data line may be stored in print data line FIFO memory buffer on memory device 201, for example, and may therefore be accessed by the print engine 170. At operation 520, the print data line may be processed into frames, as described above and in further detail with respect to FIG. 5B below.

According to operation 530, after a line has been divided into frames, the print engine 170 may feed the frames into a frame FIFO memory buffer, which may be stored on memory device 201, for example. In operation 540, print engine 170, or printhead controller 165, may retrieve frames from the frame FIFO memory buffer and feed a frame to printhead 130. More specifically, the printhead driver 150, may signal the printhead 130 to strobe the dots according to the frame, as shown by operation 550. The printhead 130 may strobe the dots to print to the media 120 for the duration of the strobe time for that frame.

At operation 560, after dots have been strobed, the print engine 170, with the motor controller 160, for example, may signal the motor driver 161 to cause the motor 110 to advance the media. In response, the motor 110 may cause the media to move (not depicted), positioning the media for subsequent strobing.

At operation 580, print engine 170 may determine if there are additional frames for processing the current print data line, and if so, steps 530-580 may be repeated until the print data line has been processed into frames, and strobed. At operation 590, print controller 102 may determine if there are additional print data lines in the print job to be printed. The operations 510-590 in the flowchart illustrated in FIG. 4 may repeat thereafter until the entire print job has been completed. The operations have been illustrated in such a way to depict the processing of a print data line into frames, and communication of the frames to the motor 110 and printhead 130. It will be appreciated that in an example embodiment, the printer controller 102 may provide print data lines to the print engine 170 via a repeatedly fed print data line FIFO memory buffer. Likewise, the print engine 170 may provide frames to the printhead driver 150 via a repeatedly fed frame FIFO memory buffer. As print data lines are processed into frames, the print engine 170 may control the printhead 130 and motor 110, via the printhead controller 165 and motor controller 160, respectively, to ensure synchronization of the printhead 130 and motor 110.

Figure 6:
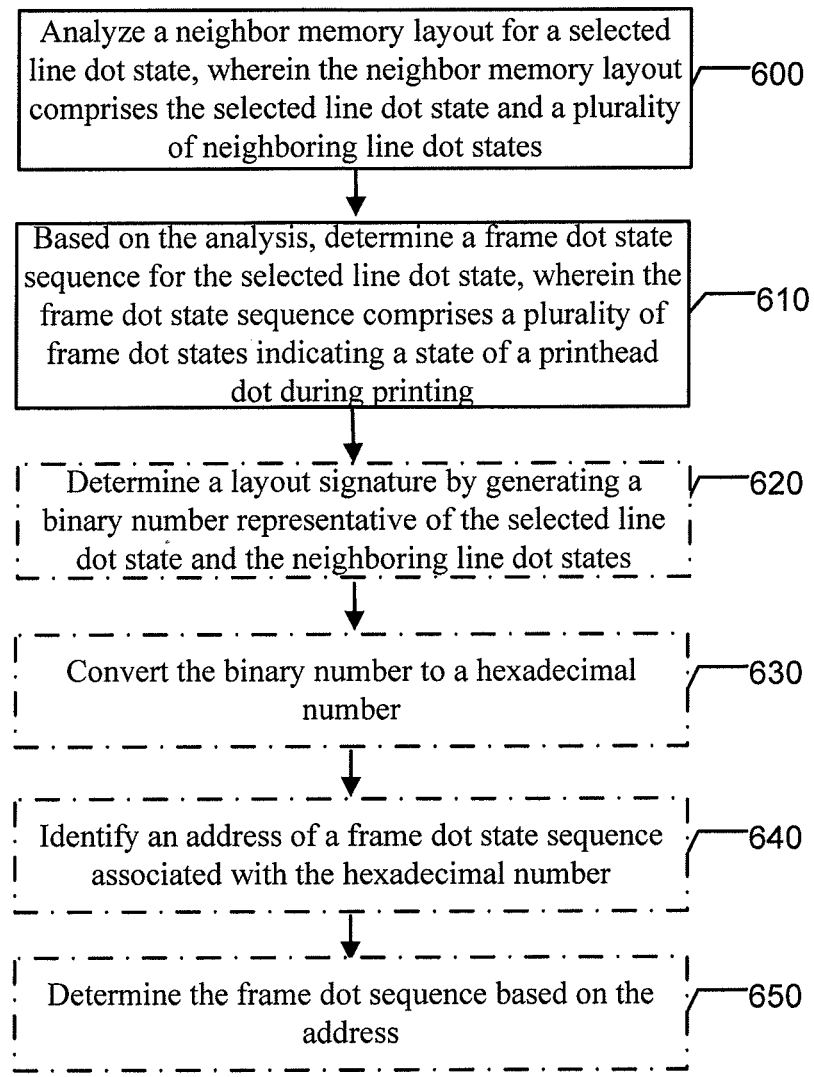
FIG. 6 is a flowchart illustrating the processing of a print data line into frames using neighbor analysis in accordance with some example embodiments.

FIG. 6 is a flowchart illustrating the processing of a print data line into frames using neighbor analysis in accordance with some example embodiments. At operation 600, the print engine 170 may analyze a neighbor memory layout for a selected line dot state, wherein the neighbor memory layout comprises the selected line dot state and a plurality of neighboring line dot states. In order to determine the frame dot state sequences for the dots, print engine 170 may access the data representing the current line, the next two lines to be printed, and the past line that was printed. Other embodiments may consider any number of past lines, any number of future lines, or any number of spatial neighbors to determine the frame dot state sequences. At operation 610, based on the analysis, the print engine 170 may determine a frame dot state sequence for the selected line dot state, wherein the frame dot state sequence comprises a plurality of frame dot states indicating a state of a printhead dot during printing.

In some embodiments, determining the frame dot state sequence may optionally include (as shown by the dashed outlines) operations 620-650. As described above with reference to an example embodiment and with respect to FIGS. 2A-2D, at operation 620, the print engine 170 may determine a layout signature by generating a binary number representative of the selected line dot state and the neighboring line dot states.

At operation 630, the print engine 170 may convert the binary number to a hexadecimal number. At operation 640, the print engine 170 may identify an address of a frame dot state sequence associated with the hexadecimal number. The address may be identified using a table such as the example table of FIG. 3A. At operation 650, the print engine 170 may determine the frame dot state sequence based on the address, with a table such as the table of FIG. 3B, for example.

One of ordinary skill in the art would appreciate that various permutations of frame dot state sequences may be defined and utilized and the description above provide only a subset of the various options. In this regard, different example embodiments may be defined that include variations on the number of frames per print line, differing frame strobe times, differing frame dot state sequences, and the like. Using a combination of these variables can, in some example embodiments, advantageously cause the printing device to utilize residual heat generated by the thermal printhead to reduce unnecessary heating of the dots and conserve power as well as produce faster, higher quality print jobs.

Motor Control

According to some example embodiments, a printer (e.g., a printing device 100) may also be controlled by the print engine 170 to perform motor control. The speed of the motor during any portion of a print job may be related to the content of the line that is being printed. For example, if a line of whitespace is being printed (short or no strobe time needed), the motor 110 may be capable of forming the line using the maximum motor speed (i.e., since no actual printing of the media is being performed). On the other hand, if a dark solid line of content is being printed for a given print line (longer strobe time needed), then the motor 110 may be required to move at a significantly slower speed during the printing of that line so that the printhead 130 can interface with media long enough to perform proper heating of the media. However, abrupt changes in motor speed, such as one that may be encountered when printing a solid line followed by white space, may cause undesirable noises, as well as jerky movement of the printer, which in some cases may cause the printer to stall or otherwise malfunction.

In example embodiments, the maximum motor speed to print a line may be defined based on the line strobe time needed to print the line. In a multi-frame line printing scheme, such as those described above, the motor speed may be based on the frame strobe times that are being used to print the line. However, the frame strobe times may also be a function of the line strobe time, and therefore the line strobe time may be considered in determining the motor speed needed to support proper printing. Based on the content of the line to be printed, as provided, for example, in the print lines 310 of the print data line FIFO memory buffer, a line strobe time and an associated maximum speed for printing each line based on the respective line strobe time can be determined.

Figures 7A, 7B:
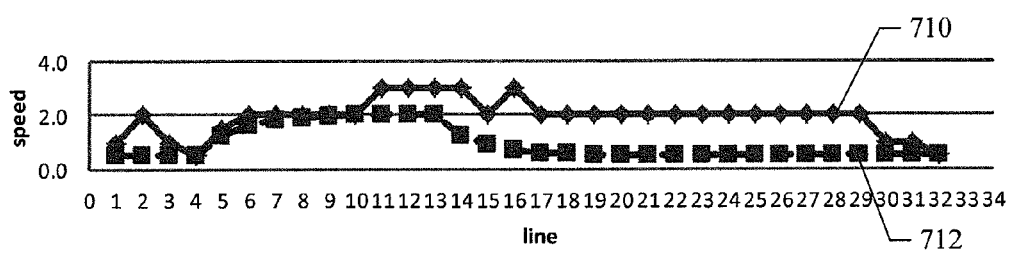
FIG. 7A illustrates example print data lines with respective strobe times and motor speeds in accordance with some example embodiments.
FIG. 7B is a graph of motor speeds in accordance with some example embodiments.

FIG. 7A illustrates print data lines 310, a column 700 indicating corresponding maximum media speeds in ips, for example, that the media could move during printing of a corresponding line, a column 702 indicating corresponding line strobe times, and a column 704 indicating actual speeds of the motor, as calculated according to the operations described herein. For purposes of the foregoing description and appended claims, the term "actual speeds" or "actual motor speed" does not refer to a measured motor speed. Rather, these terms are meant to refer to a calculated motor speed setting for engaging the motor and could differ from the actual speed of the motor if measured externally.

Although previous example embodiments illustrate print data lines for a printing device 100 comprising a printhead 130 having 5 dots, the example data provided with respect to FIG. 7A assumes a printhead 130 having 4 dots. As described above, it will be appreciated that the processes and operations described herein may be applied to a printhead 130 having any number of dots.

Considering a print data line FIFO memory buffer as described above, each time a line is processed and/or printed, that print data line may be removed from the print data line FIFO memory buffer, and a new print data line may be inserted. With each iteration, a new analysis of the print data line FIFO memory buffer may be performed and the actual speed of the motor 110 may be adjusted to the new slowest speed based on the analysis, or the speed may be increased when a faster speed is appropriate. Data provided in area 706 of FIG. 7A provides example print data lines and corresponding maximum motor speeds and line strobe times, that may be provided in a print data line FIFO memory buffer capable of storing data for 16 lines. The data provided in area 706 (and/or the print data line FIFO memory buffer) may therefore be used in determining an actual motor speed during the printing of line 1, for example. For calculation of an actual motor speed for line 2, lines 2-17 may be accessed in the print data line FIFO buffer, and so on, allowing the print engine 170 to "look ahead" 16 lines each time the print engine 170 calculates an actual motor speed for a particular line.

Maximum motor speeds, such as those in column 700, may be determined based on the line strobe times, which may be based on the content of the line that is to be printed (e.g., according to the print data line). Accordingly, a motor control technique can utilize the line strobe times as an input for determining the actual speed at which to run the motor 110 at a given time by converting the line strobe time into a maximum speed for the motor 110 (and therefore the speed of the media 120). It is understood, that while the information in column 700 indicates the maximum speed for printing the respective line based on the line strobe time needed to print the line, the motor 110 could move at a slower speed, such that the overall time the printhead 130 spends over the corresponding area of the media 120 is longer than the strobe time needed to print the dot images of the line.

According to various example embodiments, the print engine 170 may be configured to analyze the determined line strobe times for each line in a given set of lines to be printed and to identify the longest duration line strobe time from within the set. For example, referring to FIG. 7A, the set may be defined as the 16 line memory of the print data line FIFO memory buffer. Over the first 16 lines, the print engine 170 may identify a relatively long line strobe time of 0.003, and a corresponding slow motor speed of 0.5 for Line 5. Accordingly, the print engine 170 may set the actual motor speed for lines 1-4 to gradually increase, as to avoid a drastic increase in motor speed from the printing of line 4 to the printing of line 5. As such, the actual motor speeds calculated for lines 1-4 may be less than the corresponding maximum speeds in column 700.

The print engine 170 may perform an analysis each time a new print data line is introduced to the set. When a new print data line enters the print data line FIFO memory buffer, the print engine 170 may be configured to calculate an actual motor speed for a line based on some or the entire content of the print data line FIFO memory buffer. As such, during processing of line 5, the print engine 170 may analyze lines 5-20. In lines 5-20, the lowest maximum motor speed is 2. The print engine 170 may therefore determine actual motor speeds that increase, from line 5, until 2 ips is reached at or around line 9. The actual motor speed and/or media speed may be maintained at 2 ips through the printing of line 13. Following printing of line 13, lines 14-29 may be made accessible in the print data line FIFO memory buffer. A slower speed of 1 ips is needed to print line 29. The print engine 170 may therefore begin decreasing the motor speeds in anticipation of printing line 29.

According to some example embodiments, the print engine 170 may cause the motor 110 to reduce speed in incremental steps, rather than using a drastic change in speed. For example, the print engine 170 may be configured to control the motor 110 to reduce the speed of the media by 0.4 ips increments per line. By avoiding larger changes in speed, unwanted audible noises from the printer, line overprinting due to a stalled motor, and printer malfunction can be avoided. Similarly, when the analysis indicates that an increase in speed may be performed, incremental increases in speed may be used. The incremental steps for increasing speed may be the same change used for reducing the speed or the step amount may be different. According to some example embodiments, the number of print data lines in the print data line FIFO memory buffer can be defined, such that using an incremental step per line, the motor 110 may be able to transition from the slowest/fastest speed to the fastest/slowest speed within the span of the number of print data lines in the print data line FIFO memory buffer.

FIG. 7B is a graph of the maximum motor speeds 710 (corresponding to column 700 of FIG. 7A), and actual motor speeds 712 (corresponding to column 704 of FIG. 7A). As illustrated, and described above, the actual motor speeds 712 may be equal to or less than the maximum motor speeds 710, but may not be greater than the maximum motor speeds. Additionally, the actual motor speeds 712 show smoother and more gradual changes in speed between lines, as opposed to the maximum motor speeds 710, that may otherwise produce jerky movements and undesirable noise.

Figure 7C:
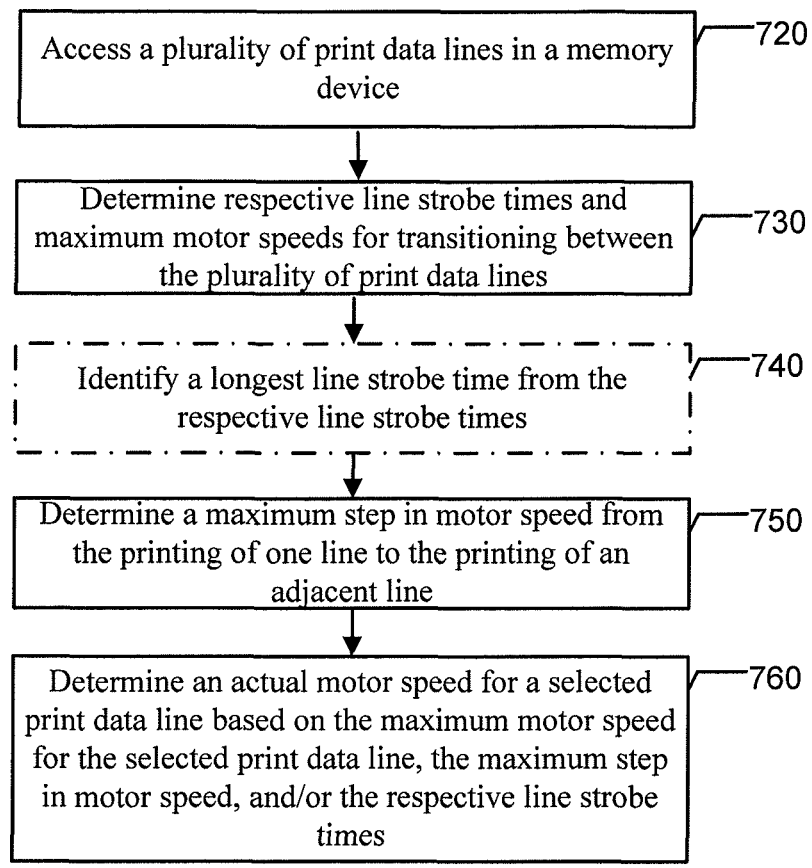
FIG. 7C is a flowchart illustrating operations that may be performed by a print engine 170 to implement motor control in accordance with some example embodiments.

FIG. 7C is a flowchart illustrating operations that may be performed by a print engine 170 to implement motor control as described above. At operation 720, the print engine 170 may access a plurality of print data lines in a memory device, such as memory device 201. At operation 730, the print engine 170 may determine respective line strobe times and maximum motor speeds for the print data lines, as described above with respect to FIG. 7A. At operation 740, the print engine 170 may identify a longest strobe time from the respective line strobe times. At operation 750, the print engine 170 may determine a maximum step in motor speed from the printing of one line to the printing of an adjacent line. At operation 760, the print engine 170 may determine an actual motor speed for a selected print data line based on the maximum motor speed for the selected print data line, the maximum step in motor speed, and/or the respective line strobe times. In some embodiments, an actual motor speed may also be based on the longest line strobe time from the respective line strobe times. Example actual motor speeds are illustrated in and described with respect to FIG. 7B above. The actual motor speed of a line may be no faster than the maximum speed required to print the line, but may be impacted by a subsequent longer strobe time, and the maximum step as identified by the print engine 170.

Example methods and apparatuses are therefore provided for controlling the speed of the motor to arrive at a more gradual transition between printing of lines while considering the line strobe times associated with printing future lines. In this regard, a print data line FIFO memory buffer may be used by the print engine 170 to look ahead at future print data lines to determine the longest line strobe time and the slowest maximum speed. While the example embodiments discussed above consider sixteen print data lines to determine the longest strobe time and corresponding smallest motor speed, one of ordinary skill in the art will readily appreciate that any number of print data lines may be similarly analyzed depending on the application.

Printhead Detection

According to various example embodiments, the interface offered by a particular printhead 130 may be static and non-configurable. However, the print engine 170 may be configurable, and upon detecting which type of printhead 130 has been installed in a printing device, such as printing device 100, the print engine 170 may reconfigure its interface according to the printhead type for subsequent operation. Example methods and apparatuses are therefore provided for detecting a type of printhead 130 installed in a printing device 100 to configure the interface to operate with the detected printhead 130.

The print engine 170, according to some example embodiments, may be configured to send a signal to an installed printhead 130 in an effort to detect the type of printhead 130 that has been installed. The print engine 170 may first choose an output pin from the processing circuitry 200 being controlled by the print engine 170 to an input to the printhead 130, and transmit a signal on the selected output pin. The selection of the print engine output pin may be based on the output pin used to communicate with a previously installed printhead 130, or a default first option may be used.

The print engine 170 may then monitor a print engine input pin of processing circuitry 200 that is connected to the printhead 130 to determine whether a return signal is received. If a return signal is received on the input pin, the print engine 170 may confirm the printhead type that has been installed in the printing device based on the output pin being used, and configure the print engine's interface for operation with the printhead 130.

If the print engine 170 does not receive a return signal on the input pin that is being monitored, the print engine 170 may select an additional print engine output pin to the printhead 130 and send a signal on the additional print engine output pin. The selection of the additional print engine output pin may be performed based on, for example, a predetermined sequence of options. If a return signal is provided in response to the signal being sent on the additional print engine output pin, the print engine 170 may confirm the printhead type that has been installed based on the additional output pin being used, and configure the interface for operation with the printhead 130 accordingly. If, however, no return signal is provided on the monitored input, then another print engine output pin may be selected, or an error event may be detected indicating, for example, that an improper or defective printhead has been installed.

According to some example embodiments, the various print engine output pins of the processing circuitry 200 being controlled by the print engine 170 may be associated with printheads from particular manufacturers. For example, if an acknowledgement is returned when a signal is sent on a first print engine output pin of the processing circuitry, then a Kyocera printhead may be identified. Further, if an acknowledgement is returned when a signal is sent on a second print engine output line of the processing circuitry, then a Rohm printhead may be identified.

FIGS. 8A and 8B indicate example pin configurations for two different printheads, where FIG. 8A displays a pin configuration for a first printhead (e.g., a Rohm printhead) and FIG. 8B displays a pin configuration for a second printhead (e.g., a Kyocera printhead). Note that both printheads share the same printhead output pin (i.e., pin 4), but each uses a different printhead input pin (i.e., pin 25 in FIG. 8A and pin 23 in FIG. 8B). In some embodiments, various printheads 130 may not necessarily be configured to use the same pin as a printhead output pin.

Figure 9:
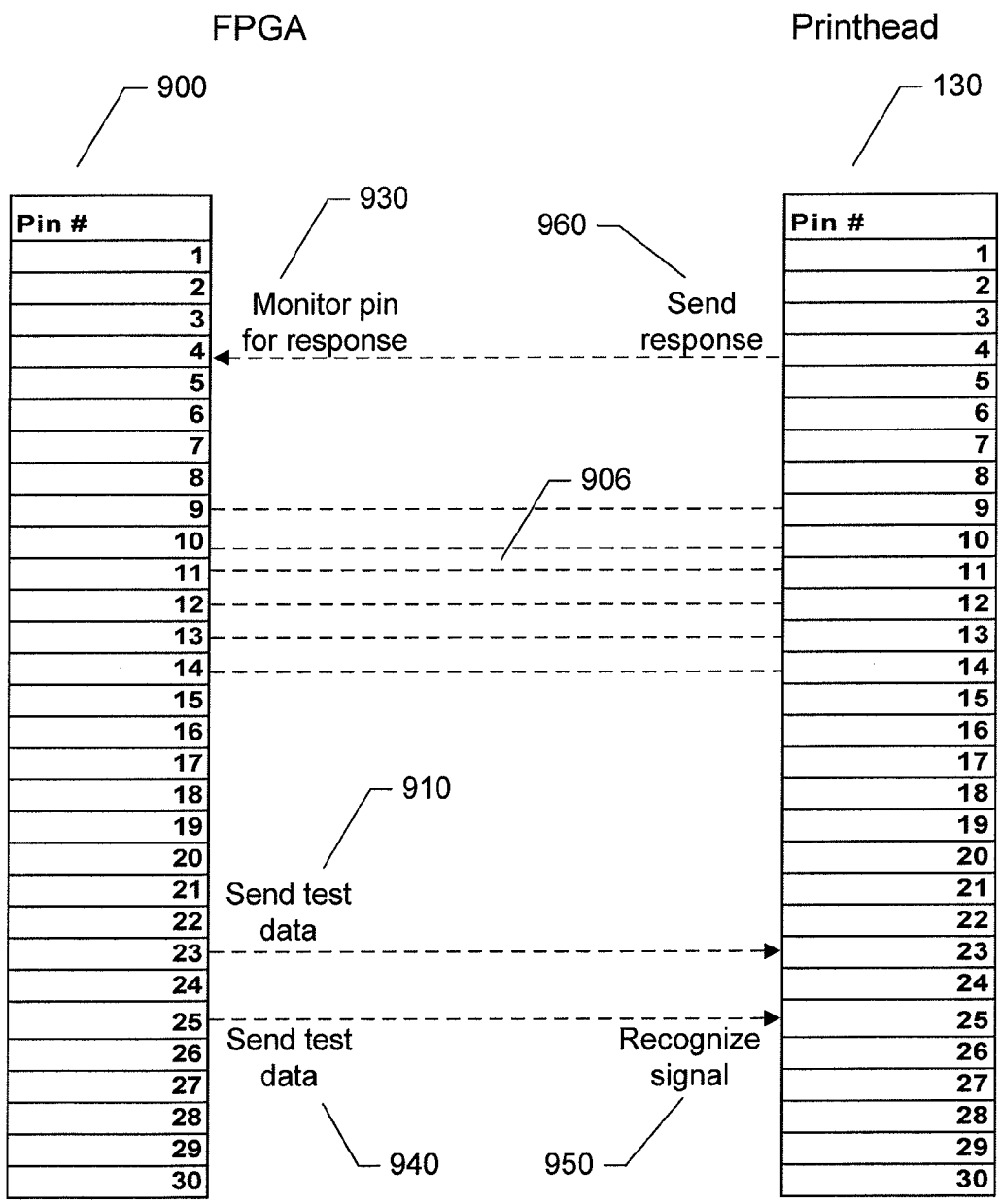
FIG. 9 is an illustration of communications between a FPGA and printhead in accordance with some example embodiments.

In some embodiments, the processing circuitry 200 embodying the print engine 170 may be implemented on a FPGA, along with the memory device 201. The FPGA may be connected to a printhead 130 via a 30 pin connector, for example. FIG. 9 is an illustration of communications between a FPGA and printhead according to an example embodiment. FPGA 900 may be connected to a printhead 130, of unknown type, via numerous connectors 906 (which may be included or otherwise embodied as data lines 180, for example) that may be unidirectional, or bidirectional, to transmit signals and/or data between the FPGA and printhead. As indicated at operation 910, the print engine 170 may be configured to select a first print engine output pin, for example pin 23, and send a signal on that pin. In this particular example, the printhead 130 is not configured to receive data on pin 23, and the printhead 130 fails to respond. As shown by operation 930, the print engine 170 may monitor pin 4 for a response, but at this point in time, detects nothing.

As shown by operation 940, the print engine 170 may then subsequently send a signal on print engine output pin 25. As indicated at 950, the printhead 130 recognizes the signal, and sends a response, at operation 960, on pin 4. While monitoring pin 4 for a response, print engine 170 detects the response, and may identify the unknown printhead 130 based on the successful test on pin 25. The print engine 170 may then identify the printhead as the Rohm printhead illustrated in FIG. 8A.

Figure 10:
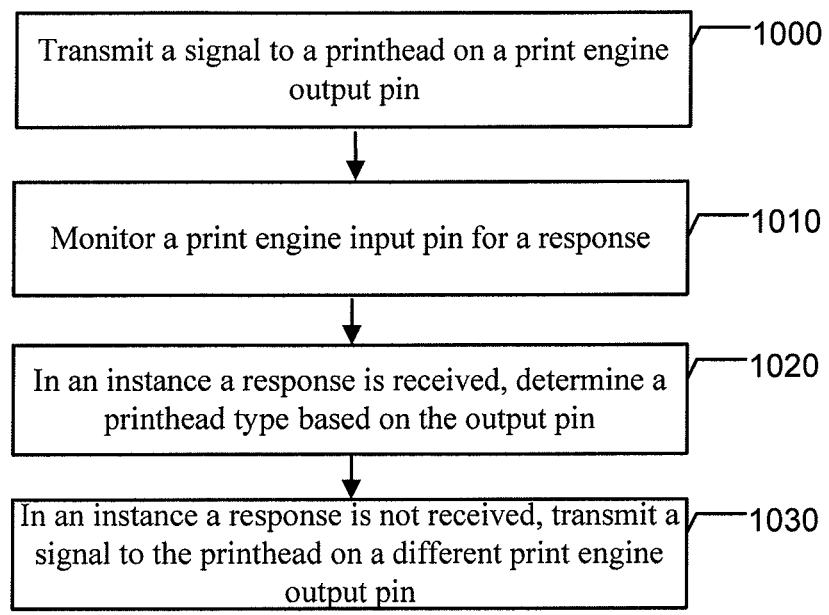
FIG. 10 is a flowchart illustrating operations for detecting a printhead in accordance with some example embodiments.

FIG. 10 is a flowchart illustrating operations for detecting a printhead, as described above. At operation 1000, the print engine 170 may transmit a signal to a printhead on a print engine output pin. At operation 1010, the print engine 170 may then monitor a print engine input pin for a response. As shown by operation 1020, in an instance a response is received, the print engine 170 may determine a printhead type based on the output pin.

As shown by operation 1030, in an instance a response is not received, the print engine 170 may transmit a signal to the printhead on a different print engine output pin. In this regard, operations 1000-1030 may be repeated until a printhead type is identified. Additionally, according to some example embodiments, a response received by the print engine 170 may include data that can be analyzed to determine the width of the printhead or number of dots on the printhead. In this regard, the signal sent to the printhead 130 may include test data (e.g., a particular series of ones and zeros) that can be processed as the test data passes through the memory buffer of the printhead 130. The test data may be processed, and the response signal returned to the print engine 170 may be interpreted by the print engine 170 as to indicate how many dots are present on the printhead 130.

As mentioned above, the print engine 170 may reconfigure the interface to the printhead 130 based on the detected type of printhead 130 and the determined width of the printhead 130. Because printheads can have different operating specifications, being able to detect and adapt the interface and subsequent operation of the print engine 170 based on the detected printhead can result in more efficient and higher quality printing.

Many aspects of the present invention rely on thermal printing devices. Some thermal printing devices may print a variety of colors at various threshold temperatures. While some embodiments of the present invention may take advantage of these capabilities, example embodiments have been described with respect to printing black images on a white medium. As will be apparent to one of ordinary skill in the art, the methods and apparatuses disclosed herein may be used with various types and colors of media and print.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A method comprising:
accessing a plurality of print data lines in a memory device;
determining respective line strobe times and maximum motor speeds for the plurality of print data lines;
determining a maximum step in motor speed for printing one of the plurality of print data lines to printing an adjacent one of the plurality of print data lines; and
determining an actual motor speed for a selected print data line based on the maximum motor speed for the selected print data line, the maximum step in motor speed, and the respective line strobe times.

2. A method according to claim 1, further comprising:
identifying a longest strobe time from the respective strobe times, wherein the determining the actual motor speed for the selected print data line is further based on the longest strobe time.

3. A method according to claim 1, further comprising:
retrieving the selected print data line from a first-in first-out memory buffer.

4. A method according to claim 3, wherein determining the maximum step in motor speed is based on at least a number of print data lines in the first-in first-out memory buffer.

5. A computer program product comprising at least one non-transitory computer-readable storage medium having computer-executable program code instructions stored therein, the computer-executable program code instructions comprising program code instructions to:
access a plurality of print data lines in a memory device;
determine respective line strobe times and maximum motor speeds for the print data lines;
determine a maximum step in motor speed from a printing of one line to a printing of an adjacent line; and
determine an actual motor speed for a selected print data line based on the maximum motor speed for the selected print data line, the maximum step in motor speed, and the respective line strobe times.

6. A computer program product according to claim 5, wherein the computer-executable program code instructions further comprise program code instructions to:
identifying a longest strobe time from the respective strobe times, wherein the determining an actual motor speed for a selected print data line is further based on the longest strobe time.

7. A computer program product according to claim 5, wherein the computer-executable program code instructions further comprise program code instructions to:
retrieving the selected print data line from a first-in first-out memory buffer.

8. A computer program product according to claim 7, wherein determining the maximum step in motor speed is based on at least on a number of print data lines in the first-in first-out memory buffer.

9. A printing device comprising processing circuitry configured to:
access a plurality of print data lines in a memory device;
determine respective line strobe times and maximum motor speeds for the print data lines;
determine a maximum step in motor speed from a printing of one line to a printing of an adjacent line; and
determine an actual motor speed for a selected print data line based on the maximum motor speed for the selected print data line, the maximum step in motor speed, and the respective line strobe times.

10. A printing device according to claim 9, wherein the processing circuitry is further configured to:

identify a longest strobe time from the respective strobe times, wherein the determining the actual motor speed for the selected print data line is further based on the longest strobe time.

11. A printing device according to claim 9, wherein the processing circuitry is further configured to:
retrieve the selected print data line from a first-in first-out memory buffer.

12. A printing device according to claim 9, wherein determining the maximum step in motor speed is based on at least on a number of print data lines in the first-in first-out memory buffer.

* * * * *